US012629874B2

(12) United States Patent
Simpson et al.

(10) Patent No.: US 12,629,874 B2
(45) Date of Patent: May 19, 2026

(54) APPARATUS AND METHOD FOR TWO SHOT INJECTION MOLDING AND COMPONENTS FORMED BY THE METHOD

(71) Applicant: INTEVA PRODUCTS, LLC, Troy, MI (US)

(72) Inventors: Ashley Simpson, Royal Oak, MI (US); Thomas Sybrandy, Washington, MI (US); Brian Staser, Oxford, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 1298 days.

(21) Appl. No.: 17/007,422

(22) Filed: Aug. 31, 2020

(65) Prior Publication Data

US 2021/0060834 A1      Mar. 4, 2021

Related U.S. Application Data

(60) Provisional application No. 62/893,434, filed on Aug. 29, 2019.

(51) Int. Cl.
 *B29C 45/13*          (2006.01)
 *B29C 45/14*          (2006.01)
  (Continued)

(52) U.S. Cl.
 CPC ........ *B29C 45/13* (2013.01); *B29C 45/14631* (2013.01); *B29C 45/164* (2013.01); *B29C 45/1676* (2013.01); *B29C 45/26* (2013.01); *B60J 5/0412* (2013.01); *B29K 2021/003* (2013.01); *B29K 2023/12* (2013.01);
  (Continued)

(58) Field of Classification Search
 CPC ... B29C 45/14; B29C 45/16; B29C 45/14631; B29C 45/164; B29C 45/1628; B29C 45/2681; B29C 2045/14942
 See application file for complete search history.

(56) References Cited

U.S. PATENT DOCUMENTS 6,004,650 A * 12/1999 Schweizer ............ B29C 70/202
                                                      264/258
6,872,345 B1 * 3/2005 Yustick ............... B29C 45/1657
                                                      264/250

(Continued)

FOREIGN PATENT DOCUMENTS

CN          101133310 A      2/2008
CN          104191568 A      12/2014
  (Continued)

OTHER PUBLICATIONS

International Search Report for International Application No. PCT/US2020/048741.

(Continued)

*Primary Examiner* — Thu Khanh T. Nguyen
(74) *Attorney, Agent, or Firm* — CANTOR COLBURN LLP

(57)          ABSTRACT

A tool for use in an injection molding process. The tool having: a first part configured to receive a dose of a first material; a second part configured to receive a dose of a second material, the second material being different from the first material, wherein the tool is configured so that the first material and the second material are injected into the tool simultaneously.

5 Claims, 7 Drawing Sheets

(51) Int. Cl.

| | |
|---|---|
| *B29C 45/16* | (2006.01) |
| *B29C 45/26* | (2006.01) |
| *B60J 5/04* | (2006.01) |
| *B29K 21/00* | (2006.01) |
| *B29K 23/00* | (2006.01) |
| *B29K 105/16* | (2006.01) |
| *B29K 509/08* | (2006.01) |
| *B29L 31/30* | (2006.01) |

(52) U.S. Cl.
CPC ...... *B29K 2105/16* (2013.01); *B29K 2509/08* (2013.01); *B29L 2031/3014* (2013.01)

(56) References Cited

U.S. PATENT DOCUMENTS

| | | | |
|---|---|---|---|
| 2006/0220415 A1 | 10/2006 | Carrier | |
| 2010/0098929 A1* | 4/2010 | Dispenza | B29C 45/14778 |
| | | | 156/245 |
| 2016/0167596 A1* | 6/2016 | Basquin | B29C 45/14786 |
| | | | 425/515 |
| 2017/0050357 A1 | 2/2017 | Kariya et al. | |
| 2017/0259477 A1* | 9/2017 | Bland | B29C 45/14631 |
| 2018/0250854 A1* | 9/2018 | Dellock | B29C 45/1618 |
| 2019/0232769 A1* | 8/2019 | Lorig | B60J 10/88 |
| 2019/0323342 A1 | 10/2019 | Pedersen | |

FOREIGN PATENT DOCUMENTS

| | | |
|---|---|---|
| CN | 106255581 A | 12/2016 |
| CN | 109843617 A | 6/2019 |
| GB | 2424614 A | 10/2006 |
| WO | 2010050101 A1 | 5/2010 |

OTHER PUBLICATIONS

Written Opinion for International Application No. PCT/US2020/048741.

German Office Action for German Application No. 212020000710.1 Issued Apr. 21, 2022, 1 Page.

CNIPA Notification of the First Office Action corresponding to CN Application No. 202080060672.5; Issue Date, Sep. 21, 2024, 22 pages.

Second CNIPA Office Action corresponding to CN Application No. 2025010100255240; Issue Date, Jan. 1, 2025, 30 pages.

CNIPA Decision of Rejection corresponding to CN Application No. 202080060672.5; Issue date, Dec. 9, 2025, 31 pages.

CNIPA Notification of the Third Office Action corresponding to CN Application No. 202080060672.5; Issue date, Jun. 18, 2025, 23 pages.

* cited by examiner

APPARATUS AND METHOD FOR TWO SHOT INJECTION MOLDING AND COMPONENTS FORMED BY THE METHOD

CROSS REFERENCE TO RELATED APPLICATIONS

This application claims the benefit of U.S. Provisional Patent Application No. 62/893,434 filed on Aug. 29, 2020, the entire contents of which are incorporated herein by reference thereto.

BACKGROUND

Exemplary embodiments of the present disclosure pertain to the art of injection molding and products formed by injection molding.

During the formation of parts or components by injection molding it is desired to have different materials used in the injection molding process. Accordingly, it is desirable to provide an improved injection molding process and products formed by the process.

BRIEF DESCRIPTION

Disclosed is a tool for use in an injection molding process. The tool having: a first part configured to receive a dose of a first material; a second part configured to receive a dose of a second material, the second material being different from the first material, wherein the tool is configured so that the first material and the second material are injected into the tool simultaneously.

In addition to one or more of the features described above, or as an alternative to any of the foregoing embodiments, the dose of the first material and the dose of the second material are injected into the tool from opposite sides.

In addition to one or more of the features described above, or as an alternative to any of the foregoing embodiments, either the first part or the second part are configured to receive both the first material and the second material while separating the first material from the second material.

Also disclosed is a method of forming a part via a plastic injection molding process, the method including the steps of: simultaneously injecting a first material and a second material into a first part and a second part of a tool, the first material and the second material being separated from each other by a composite mat located in the tool and wherein the first material is different from the second material.

In addition to one or more of the features described above, or as an alternative to any of the foregoing embodiments, the first material and the second material are injected into opposite sides of the tool.

In addition to one or more of the features described above, or as an alternative to any of the foregoing embodiments, the composite mat is heated prior to being inserted into the tool.

In addition to one or more of the features described above, or as an alternative to any of the foregoing embodiments, the first material is a glass filled polypropylene and the second material is a thermoplastic elastomer.

In addition to one or more of the features described above, or as an alternative to any of the foregoing embodiments, the first material is injected into both the first part and the second part, wherein the first material injected into the second part does not make contact with the second material injected into the second part.

In addition to one or more of the features described above, or as an alternative to any of the foregoing embodiments, the part being formed by the method is a structural component of a vehicle.

In addition to one or more of the features described above, or as an alternative to any of the foregoing embodiments, the structural component of the vehicle is a door module.

In addition to one or more of the features described above, or as an alternative to any of the foregoing embodiments, the first material and the second material are injected into opposite sides of the tool.

In addition to one or more of the features described above, or as an alternative to any of the foregoing embodiments, the first material is a glass filled polypropylene and the second material is a thermoplastic elastomer.

In addition to one or more of the features described above, or as an alternative to any of the foregoing embodiments, the glass filled polypropylene defines a structural component of the door module and the thermoplastic elastomer is a seal of the door module.

In addition to one or more of the features described above, or as an alternative to any of the foregoing embodiments, the glass filled polypropylene is injected into both the first part and the second part, wherein the glass filled polypropylene does not make contact with the thermoplastic elastomer injected into the second part.

Also disclosed is a part, having: a first material; a second material, the first material and the second material being separated from each other by a composite mat, wherein the first material is a glass filled polypropylene and the second material is a thermoplastic elastomer.

In addition to one or more of the features described above, or as an alternative to any of the foregoing embodiments, the part is vehicle door module and the thermoplastic elastomer is a seal of the door module.

In addition to one or more of the features described above, or as an alternative to any of the foregoing embodiments, the part is vehicle door module and the glass filled polypropylene defines structural components of the vehicle door module.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
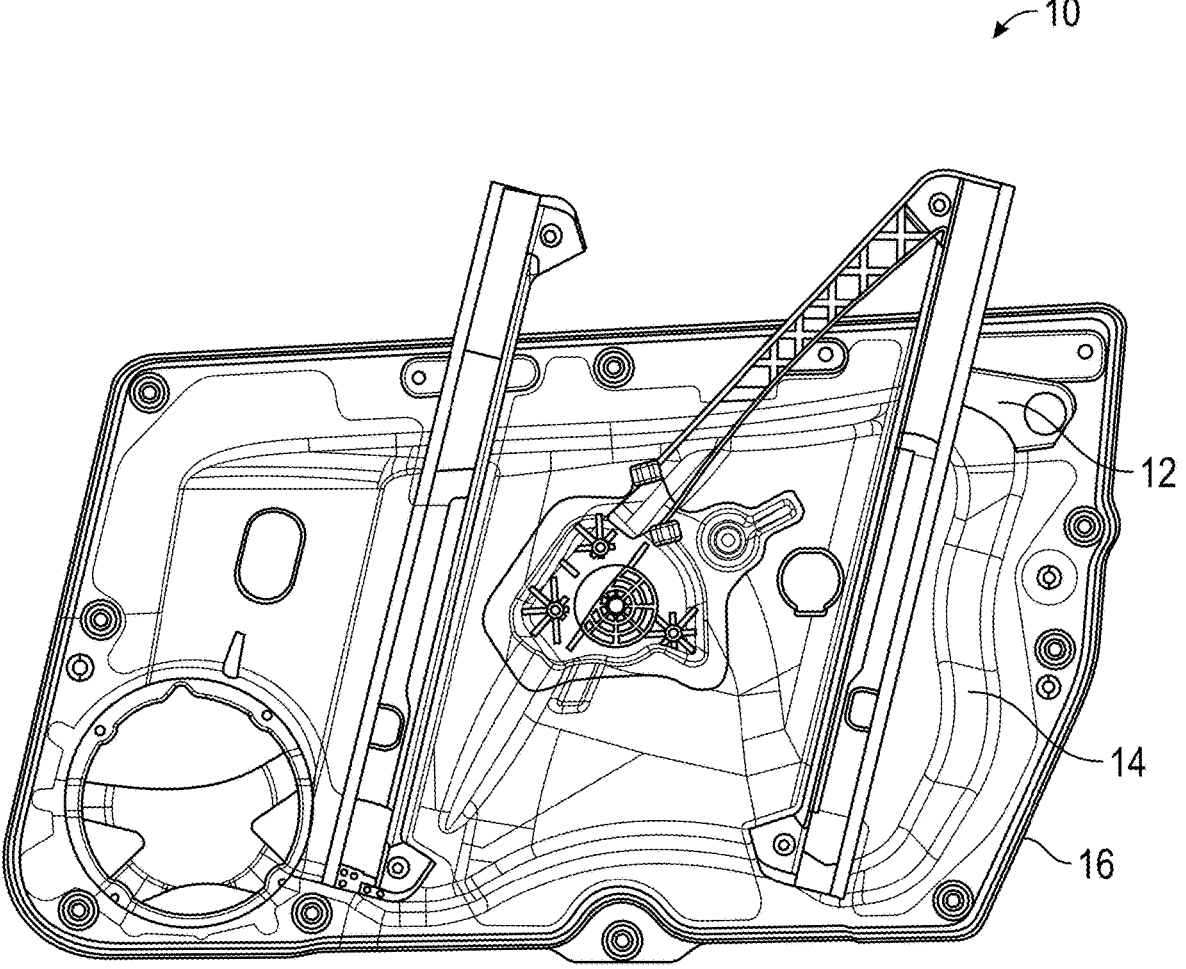
FIG. 1 is view of a door module formed in accordance with an embodiment of the present disclosure.

FIG. 1 is view of a door module 10 formed in accordance with an embodiment of the present disclosure. In accordance with one non-limiting embodiment of the present disclosure, the door module 10 will include portions formed from a glass filled polypropylene 12, a mat or composite mat, composite sheet or insert 14 and a thermoplastic elastomer (TPE) seal 16. Although a door module is illustrated in FIG. 1 it is, of course, understood that various embodiments of the present disclosure may be directed to other components formed by the apparatus and methods disclosed herein.

In one embodiment, the composite mat may be formed from natural fibers, glass fibers or combinations thereof. Still further, the mat, sheet or insert 14 may be formed of any material, composite or otherwise. For example and in one non-limiting embodiment, the mat, sheet or insert 14 may be formed from carbon fibers, steel, aluminum, or even a preformed plastic part.

Figure 2:
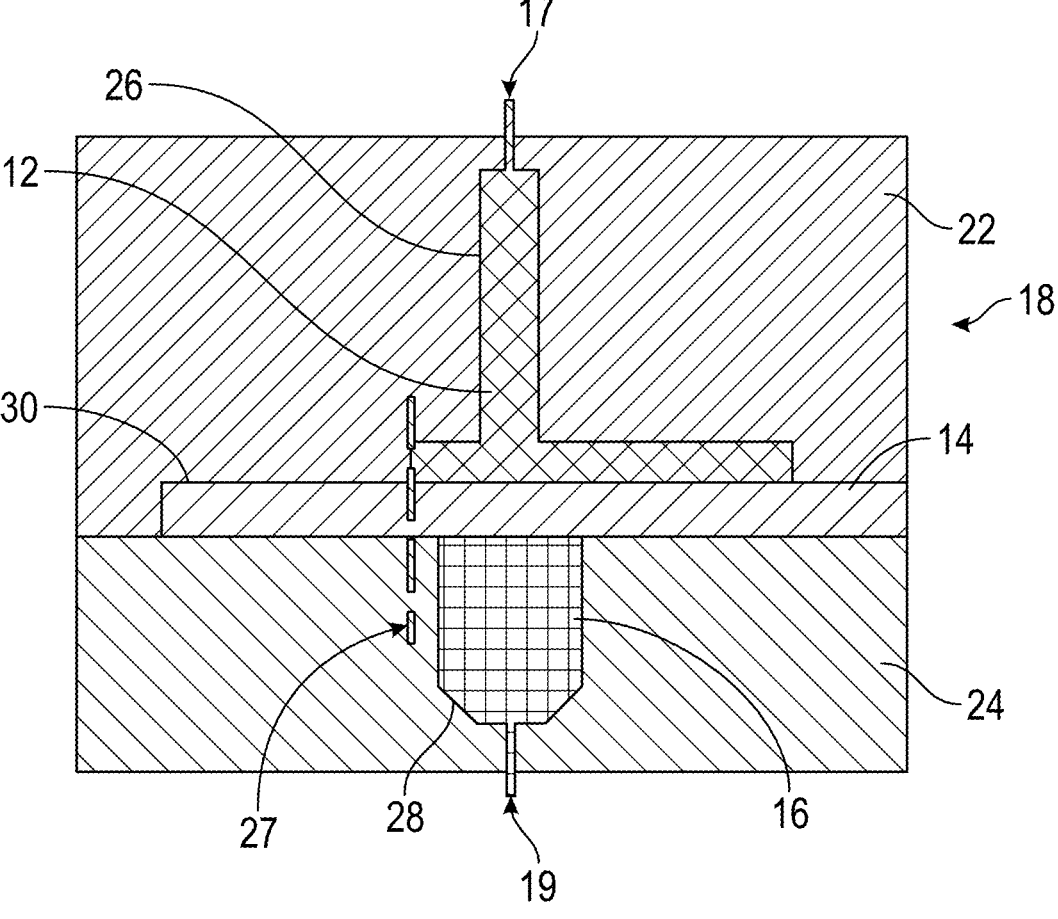
FIG. 2 is a schematic view of a tool contemplated for use in accordance with an embodiment of the present disclosure.

Referring now to FIG. 2, a schematic illustration of a tool or mold cavity 18 contemplated for use in accordance with an embodiment of the present disclosure is illustrated. Tool 18 comprises a portion of an injection molding machine (not shown). In accordance with an embodiment of the present disclosure tool 18 is configured to receive a dose of materials from opposite sides of the tool (illustrated by arrows 17 and 19) such that two different materials may be simultaneously shot into the tool.

As illustrated, the tool 18 has a first part or core 22 and a second part or cavity 24. The first part or core 22 is configured to have an internal cavity 26 that will define structural portions or a structural component of the part to be formed by the tool 18, which in one non-limiting embodiment may be a structural component of a vehicle. The in tool trim line of the structural component is illustrated by the dashed line 27. The second part or core 24 will also have an internal cavity 28 that will define other portions of the part to be formed by the tool. Using this configuration two different materials may be injected simultaneously into tool 18 as illustrated in FIG. 2.

In one non-limiting embodiment of the present disclosure, the tool or press may have twin side by side screws injecting the two different materials simultaneously or alternatively a first and a second screw, wherein at least one of the screws (e.g., the second screw) injects one of the two different materials from a side of the tool or at an angle with respect to the tool. In other words and even though the FIGS. of the present application depict materials being injected from opposite sides of the tool, the configurations of the tool and the associated injection barrels and their associated screw and nozzle need not necessarily be arranged in locations depicted in the attached FIGS.

In order to prevent the two different materials from comingling with each other during the injection molding process, the composite mat, sheet or insert 14 is inserted into the tool 18 prior to the injection molding step. In accordance with various embodiments of the present disclosure the first part 22 or the second part 24 may be configured to have a cavity 30 that is configured to receive composite mat, sheet or insert 14 therein.

In the illustrated embodiment and in one non-limiting embodiment of the present disclosure, the first part 22 is configured to receive a dose or injection 17 of a first material such as the glass filled polypropylene 12 which defines structural components of the formed product and the second part 24 is configured to receive a dose or injection 19 of a second material such as the thermoplastic elastomer (TPE) which will comprise seal 16. In one non-limiting embodiment, the dose or injection 17 of the first material is a 30% glass filled polypropylene 12. Of course, other materials, compositions and percentages of glass filled polypropylene 12 are considered to be within the scope of the present disclosure.

Figure 3A:
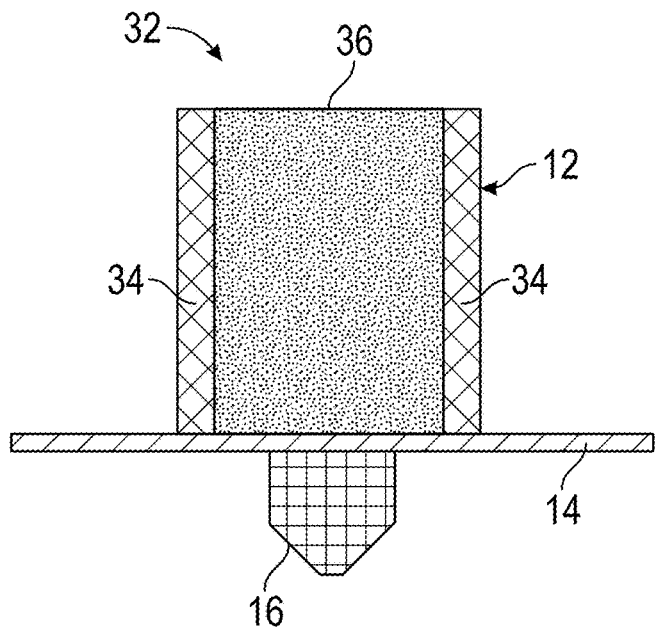
FIG. 3A is a side view of a component formed by the apparatus and method of the present disclosure.
Figure 3B:
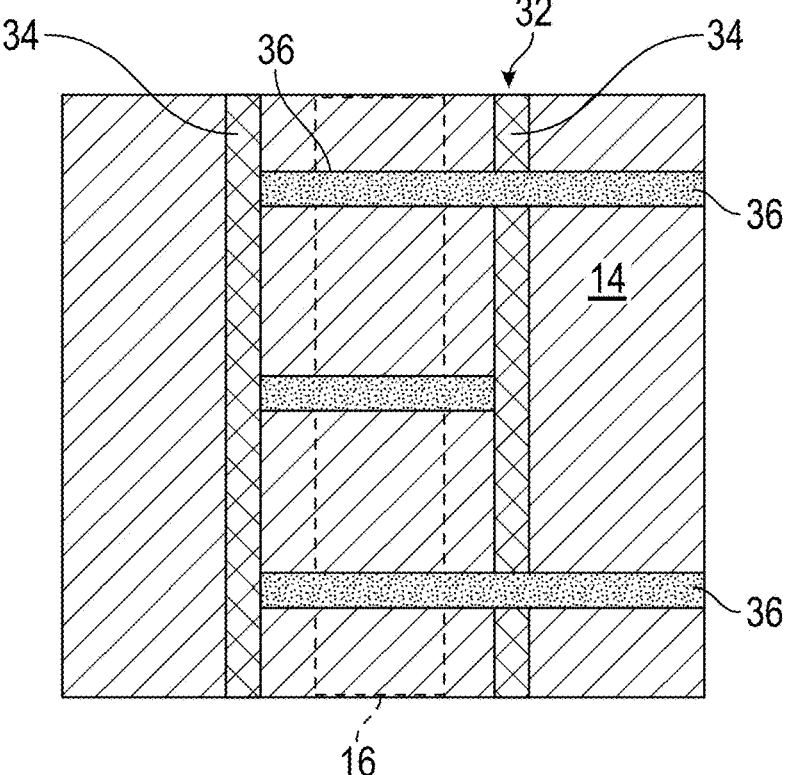
FIG. 3B is a top view of a component illustrated in FIG. 3A.

FIG. 3A is a side view of a component 32 formed by the apparatus and method of the present disclosure. In this embodiment, the portions of the component 32 formed by the glass filled polypropylene 12 may include ribs 34 and 36, wherein ribs 34 may be perimeter ribs and ribs 36 may be cross ribs extending between the perimeter ribs. As illustrated, the cross ribs 36 may have varying lengths. FIG. 3B is a top view of component illustrated in FIG. 3A.

Figure 4A:
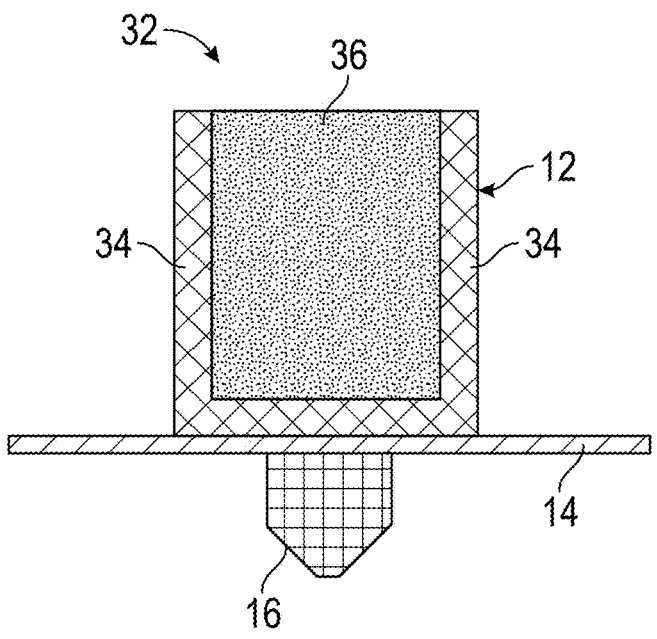
FIG. 4A is a side view of another component formed by the apparatus and method of the present disclosure.
Figure 4B:
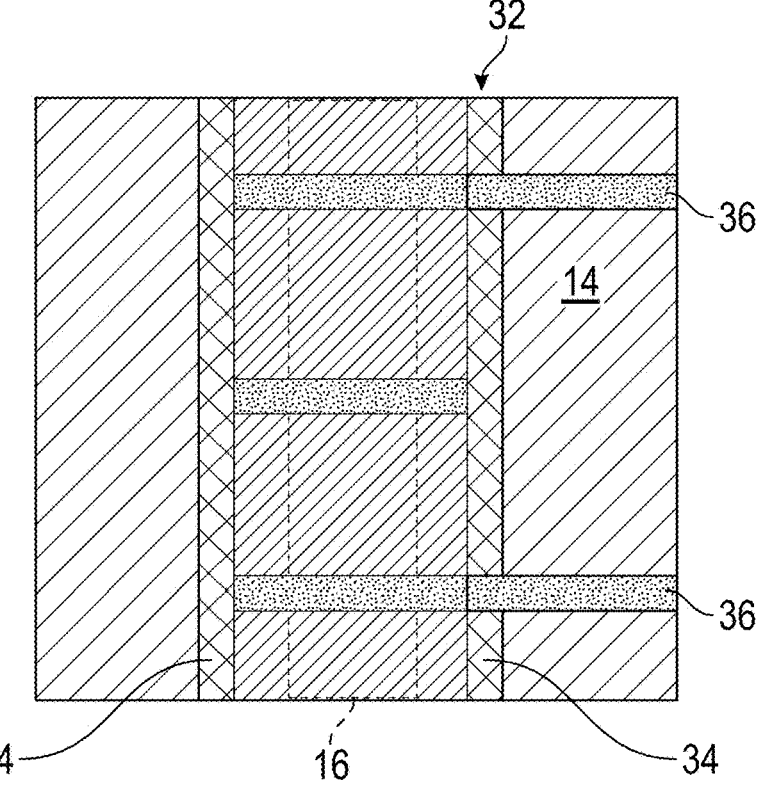
FIG. 4B is a top view of a component illustrated in FIG. 4A.

FIG. 4A is a side view of another component 32 formed by the apparatus and method of the present disclosure. In this embodiment, the portions of the component 32 formed by the glass filled polypropylene 12 may include ribs 34 and 36, wherein ribs 34 may be perimeter ribs and ribs 36 may be cross ribs extending between the perimeter ribs. In this embodiment a portion of the glass filled polypropylene 12 extends along the composite mat, sheet or insert 14 in between ribs 34. As illustrated, the cross ribs 36 may have varying lengths. FIG. 4B is a top view of the component illustrated in FIG. 4A.

Figure 5A:
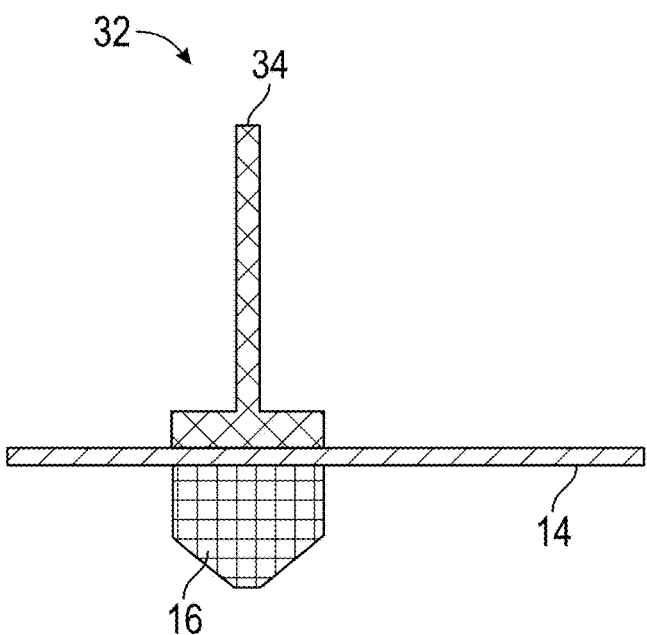
FIG. 5A is a side view of another component formed by the apparatus and method of the present disclosure.
Figure 5B:
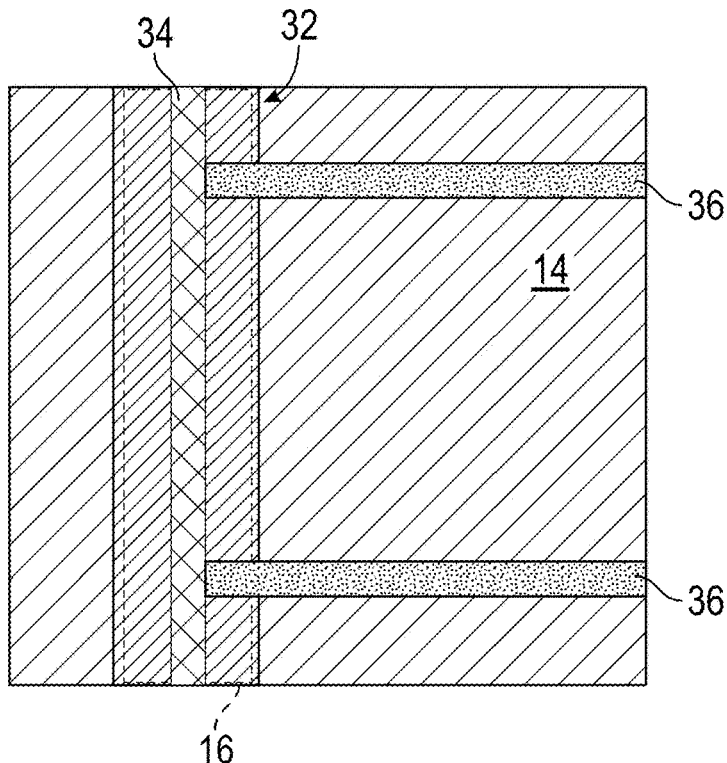
FIG. 5B is a top view of the component illustrated in FIG. 5A.
Figure 6A:
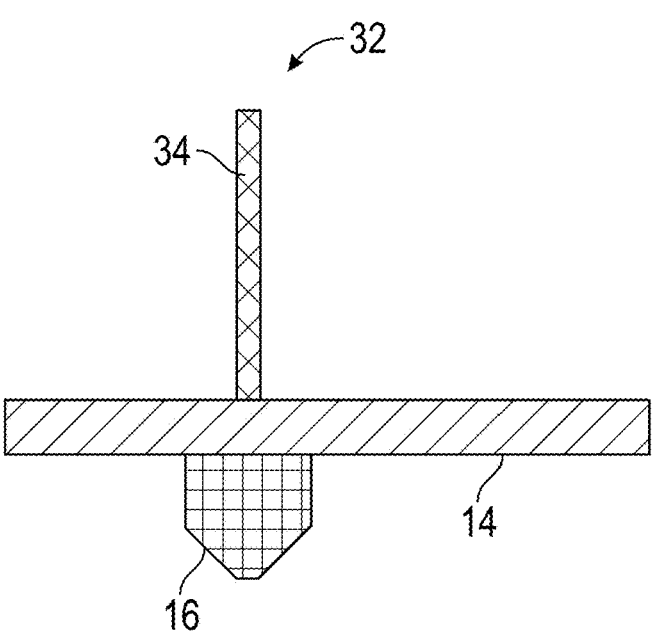
FIG. 6A is a side view of another component formed by the apparatus and method of the present disclosure.
Figure 6B:
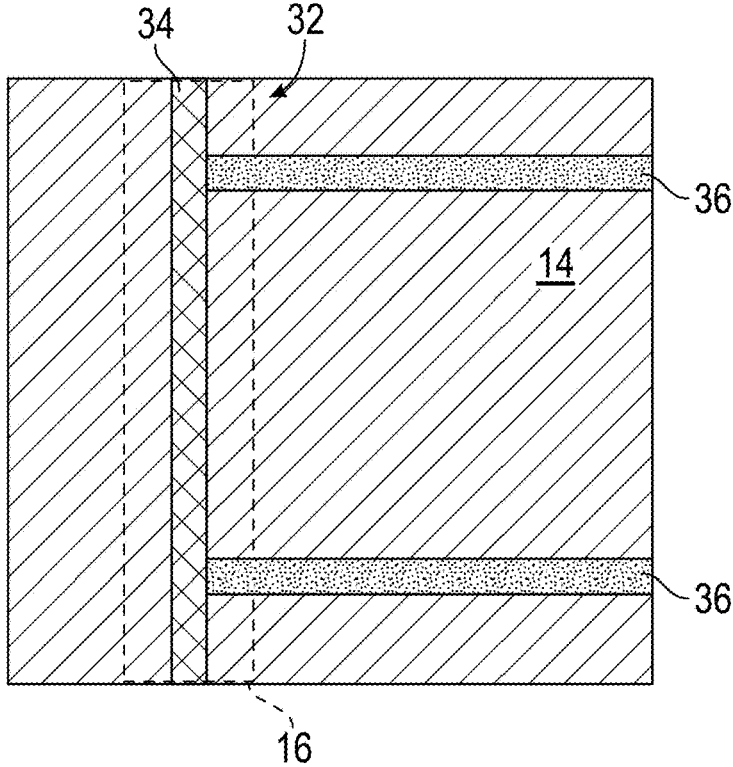
FIG. 6B is a top view of the component illustrated in FIG. 6A.

FIGS. 5A and 6A are side views of other components 32 formed by the apparatus and method of the present disclosure. In these embodiments, the portions of the component 32 formed by the glass filled polypropylene 12 may include a different configuration. FIGS. 5B and 6B are top views of the component illustrated in FIGS. 5A and 5A.

Figure 7:
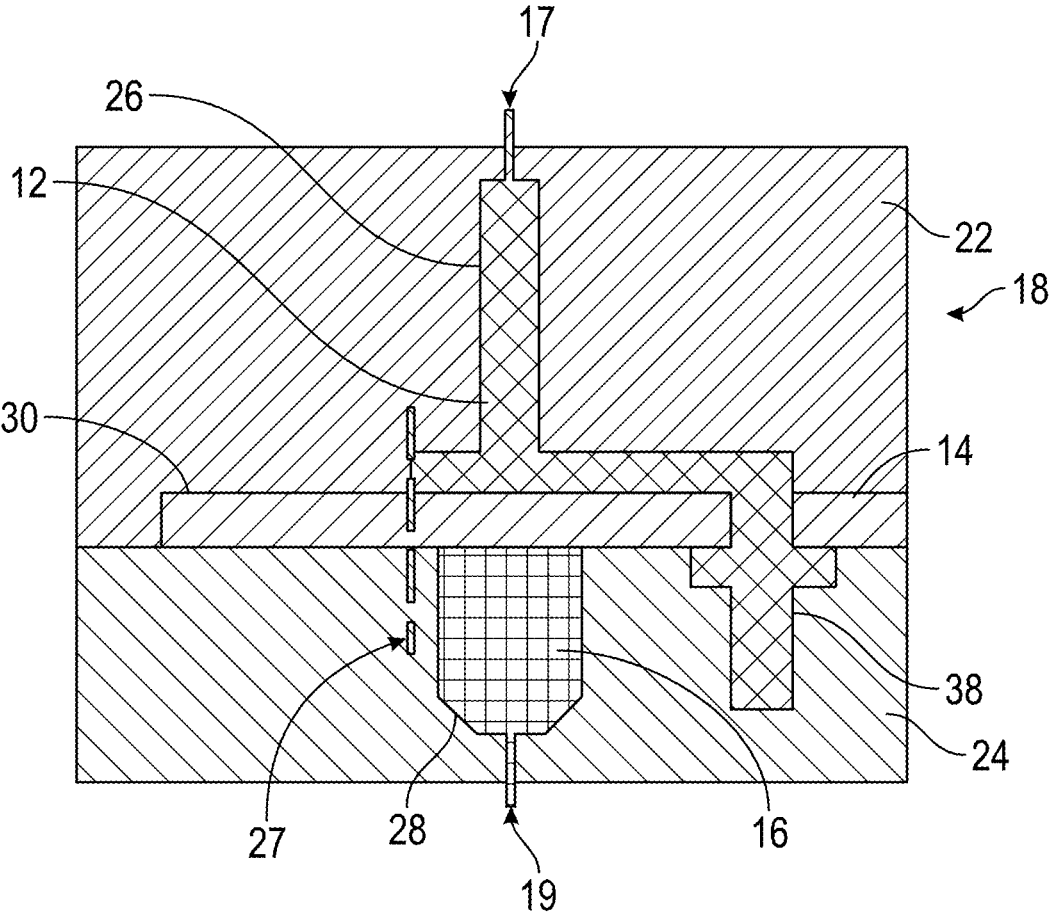
FIG. 7 is a schematic view of another tool contemplated for use in accordance with an embodiment of the present disclosure.

FIG. 7 is a schematic view of another tool 18 contemplated for use in accordance with an embodiment of the present disclosure. Once again, tool 18 comprises a portion of an injection molding machine (not shown). In accordance with an embodiment of the present disclosure tool 18 is configured to receive a dose of materials from opposite sides of the tool such that two different materials (illustrated by arrows 17 and 19) may be simultaneously shot into the tool. As illustrated, the tool 18 has a first part or core 22 and a second part or cavity 24. The first part or core 22 is configured to have an internal cavity 26 that will define the portions of the part to be formed by the tool 18. The in tool trim line of the part to be formed by the tool is illustrated by the dashed line 27. The second part or core 24 will also have an internal cavity 28 that will define other portions of the part to be formed by the tool. Using this configuration two different materials may be injected simultaneously into tool 18 as illustrated in FIG. 2.

In order to prevent the two different materials from comingling with each other during the injection molding process, the composite mat, sheet or insert 14 is inserted into the tool 18 prior to the injection molding step. In accordance with various embodiments of the present disclosure the first part 22 or the second part 24 may be configured to have a cavity 30 that is configured to receive composite mat, sheet or insert 14 therein.

In the illustrated embodiment and in one non-limiting embodiment of the present disclosure, the first part 22 is configured to receive the glass filled polypropylene 12 which defines structural components of the formed product and the second part 24 is configured to receive the thermoplastic elastomer (TPE) seal 16. However and in this embodiment, the second part 24 of the tool may further comprise another cavity 38 that will receive some of the glass filled polypropylene 12 that is injected into the first part 22. Here this material is separated from the thermoplastic elastomer (TPE) that forms seal 16 by portions of the second part 24 of the tool 18. In one non-limiting embodiment, the dose or injection 17 of the first material is a 30% glass filled polypropylene 12. Of course, other materials, compositions and percentages of glass filled polypropylene 12 are considered to be within the scope of the present disclosure.

As such, the glass filled polypropylene 12 can be injected on both sides of the mat, sheet or insert 14 so long as it is kept separated from the thermoplastic elastomer (TPE) with the tool steel.

In one embodiment, the consolidated composite mat, sheet or insert 14 is heated and then placed in the tool 18. During one implementation the composite mat, sheet or insert 14 is held around the edges outside the part to be formed and when the tool 18 closes, the mat, sheet or insert 14 is formed into a desired configuration by configurations of the cavities in the first or second parts 22, 24 of the tool 18. After the product is formed, the mat, sheet or insert 14 is either trimmed in the tool 18 or post trimmed after molding.

Using the disclosed process both shots of different materials (glass filled polypropylene 12 and thermoplastic elastomer (TPE)) can be injected simultaneously in one tool 18 without the need to rotate to new cavities of the tool for each shot.

For example and when a door module 10 is being formed by this process and/or tool this allows the regulator (glass filled polypropylene 12) and its associated seal (thermoplastic elastomer (TPE) 16) to be formed in one process instead of having to post apply a seal.

Although specific examples are shown, the processes illustrated herein may be used with many different materials that are capable of being injection molded. These materials may be of different color, or durometer. Still further, this process may also be used on many different products. (e.g., vehicle interior trim, instrument panels, door panels and numerous other components or mechanisms).

Still further, any product that would benefit from a composite insert (e.g., strength, weight, or cost benefit) and two different over molded materials is considered to be within the scope of various embodiments of the present disclosure.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of forming a part via a plastic injection molding process, comprising:
   simultaneously injecting a glass filled polypropylene and a thermoplastic elastomer into a first part and a second part respectively of a tool in order to form a vehicle door module, the glass filled polypropylene and the thermoplastic elastomer being directly opposite from each other so that they are only separated from each other by a composite mat, the composite mat being located in the tool prior to the simultaneous injection of the glass filled polypropylene and the thermoplastic elastomer, wherein the glass filled polypropylene defines a structural component located on a first side of the vehicle door module and the thermoplastic elastomer is a seal located on a second side of the vehicle door module, the first side being opposite to the second side.

2. The method as in claim 1, wherein the glass filled polypropylene and the thermoplastic elastomer are injected into opposite sides of the tool.

3. The method as in claim 1, wherein the composite mat is heated prior to being inserted into the tool.

4. The method as in claim 1, wherein the glass filled polypropylene is injected into both the first part and the second part, wherein the glass filled polypropylene injected into the second part does not make contact with the thermoplastic elastomer injected into the second part.

5. The method as in claim 1, wherein the structural component includes ribs.

* * * * *